US011836365B2

(12) United States Patent
Thakkar et al.

(10) Patent No.: US 11,836,365 B2
(45) Date of Patent: Dec. 5, 2023

(54) AUTOMATICALLY ADJUSTING STORAGE SYSTEM CONFIGURATIONS IN A STORAGE-AS-A-SERVICE ENVIRONMENT USING MACHINE LEARNING TECHNIQUES

(71) Applicant: Dell Products L.P., Round Rock, TX (US)

(72) Inventors: Bina K. Thakkar, Cary, NC (US); David C. Waser, Holly Springs, NC (US); Ashish A. Pancholi, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 283 days.

(21) Appl. No.: 17/362,139

(22) Filed: Jun. 29, 2021

(65) Prior Publication Data

US 2022/0413723 A1  Dec. 29, 2022

(51) Int. Cl.
| | | |
|---|---|---|
| *G06F 1/24* | (2006.01) | |
| *G06F 3/06* | (2006.01) | |
| *G06N 20/00* | (2019.01) | |
| *G06N 5/04* | (2023.01) | |
| *G06N 5/02* | (2023.01) | |
| G06F 9/4401 | (2018.01) | |

(52) U.S. Cl.
CPC .......... *G06F 3/0632* (2013.01); *G06F 3/061* (2013.01); *G06F 3/067* (2013.01); *G06F 3/0653* (2013.01); *G06N 5/027* (2013.01); *G06N 5/04* (2013.01); *G06N 20/00* (2019.01); G06F 9/4411 (2013.01)

(58) Field of Classification Search
CPC ...... G06F 3/0632; G06F 3/061; G06F 3/0653; G06F 3/067; G06F 9/44505; G06F 3/0604; G06F 3/0641; G06F 3/0608; G06N 5/027; G06N 5/04; G06N 20/00; H04L 41/40; H04L 41/0816; H04L 41/0886; H04L 41/0894; H04L 41/16
USPC ......................................................... 713/100
See application file for complete search history.

(56) References Cited

U.S. PATENT DOCUMENTS

| | | | |
|---|---|---|---|
| 9,053,167 B1 * | 6/2015 | Swift ..................... G06F 16/27 |
| 10,025,718 B1 * | 7/2018 | Wasiq ................ G06F 12/0866 |
| 10,222,986 B2 * | 3/2019 | George .............. H04L 67/1097 |

(Continued)

*Primary Examiner* — Volvick Derose
(74) *Attorney, Agent, or Firm* — Ryan, Mason & Lewis, LLP

(57) ABSTRACT

Methods, apparatus, and processor-readable storage media for automatically adjusting storage system configurations in a storage-as-a-service environment using machine learning techniques are provided herein. An example computer-implemented method includes obtaining performance-related data for at least one storage system in a storage-as-a-service environment; processing at least a portion of the obtained performance-related data using one or more rule-based analyses; identifying, based at least in part on results of the processing, one or more storage system configurations, of the at least one storage system, requiring adjustment; determining, using at least one machine learning technique, one or more adjustment amounts for the one or more storage system configurations; and automatically adjusting the one or more storage system configurations, within the storage-as-a-service environment, in accordance with the one or more determined adjustment amounts.

20 Claims, 8 Drawing Sheets

(56) References Cited

U.S. PATENT DOCUMENTS

| | | | |
|---|---|---|---|
| 10,397,051 B1* | 8/2019 | Featonby | H04L 41/0813 |
| 10,656,869 B1* | 5/2020 | Greenwood | G06F 11/3034 |
| 10,802,728 B2 | 10/2020 | Lee et al. | |
| 11,023,133 B2 | 6/2021 | Beloussor et al. | |
| 11,068,162 B1* | 7/2021 | Meister | G06F 3/0652 |
| 11,262,944 B1* | 3/2022 | Miller | G06F 3/061 |
| 11,275,850 B1* | 3/2022 | Brandwine | G06F 16/24564 |
| 11,442,669 B1* | 9/2022 | Frandzel | G06F 3/0605 |
| 2020/0042212 A1* | 2/2020 | Sokolovski | G06F 3/0689 |
| 2020/0057558 A1* | 2/2020 | Beloussov | G06F 3/0634 |
| 2020/0210356 A1* | 7/2020 | Dalmatov | G06F 13/20 |
| 2021/0034991 A1* | 2/2021 | Thakkar | G06F 3/0604 |
| 2021/0081111 A1* | 3/2021 | Larsen | G06F 3/064 |
| 2021/0132933 A1* | 5/2021 | Thakkar | G06F 3/0617 |
| 2021/0160317 A1* | 5/2021 | Portz | G06F 3/0644 |
| 2021/0223982 A1* | 7/2021 | Prado | G06F 3/0653 |
| 2021/0240368 A1* | 8/2021 | Thakkar | G06F 3/067 |
| 2022/0229805 A1* | 7/2022 | Chakeres | G06F 16/27 |
| 2022/0413723 A1* | 12/2022 | Thakkar | H04L 41/0886 |

\* cited by examiner

AUTOMATICALLY ADJUSTING STORAGE SYSTEM CONFIGURATIONS IN A STORAGE-AS-A-SERVICE ENVIRONMENT USING MACHINE LEARNING TECHNIQUES

FIELD

The field relates generally to information processing systems, and more particularly to storage in such systems.

BACKGROUND

Storage-as-a-service (STaaS) is a data storage model managed by at least one enterprise or other organization, and in such an environment, there can often be hundreds to thousands of storage arrays to manage. With conventional storage management approaches, management activities are typically required to be carried out during periods of low array utilization and/or during scheduled outages in order not to affect user workloads. However, periods of low array utilization and appropriate times for scheduled outages are increasingly less common for many users. Accordingly, using conventional approaches, the task of managing storage systems is often reactive as opposed to proactive, leading to configuration errors and increased costs.

SUMMARY

Illustrative embodiments of the disclosure provide techniques for automatically adjusting storage system configurations in a STaaS environment using machine learning techniques. An exemplary computer-implemented method includes obtaining performance-related data for at least one storage system in a STaaS environment, and processing at least a portion of the obtained performance-related data using one or more rule-based analyses. The method also includes identifying, based at least in part on results of the processing, one or more storage system configurations, of the at least one storage system, requiring adjustment, and determining, using at least one machine learning technique, one or more adjustment amounts for the one or more storage system configurations. Further, the method additionally includes automatically adjusting the one or more storage system configurations, within the STaaS environment, in accordance with the one or more determined adjustment amounts.

Illustrative embodiments can provide significant advantages relative to conventional storage management approaches. For example, problems associated with configuration errors and increased costs are overcome in one or more embodiments through automatically adjusting storage system configurations using machine learning techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
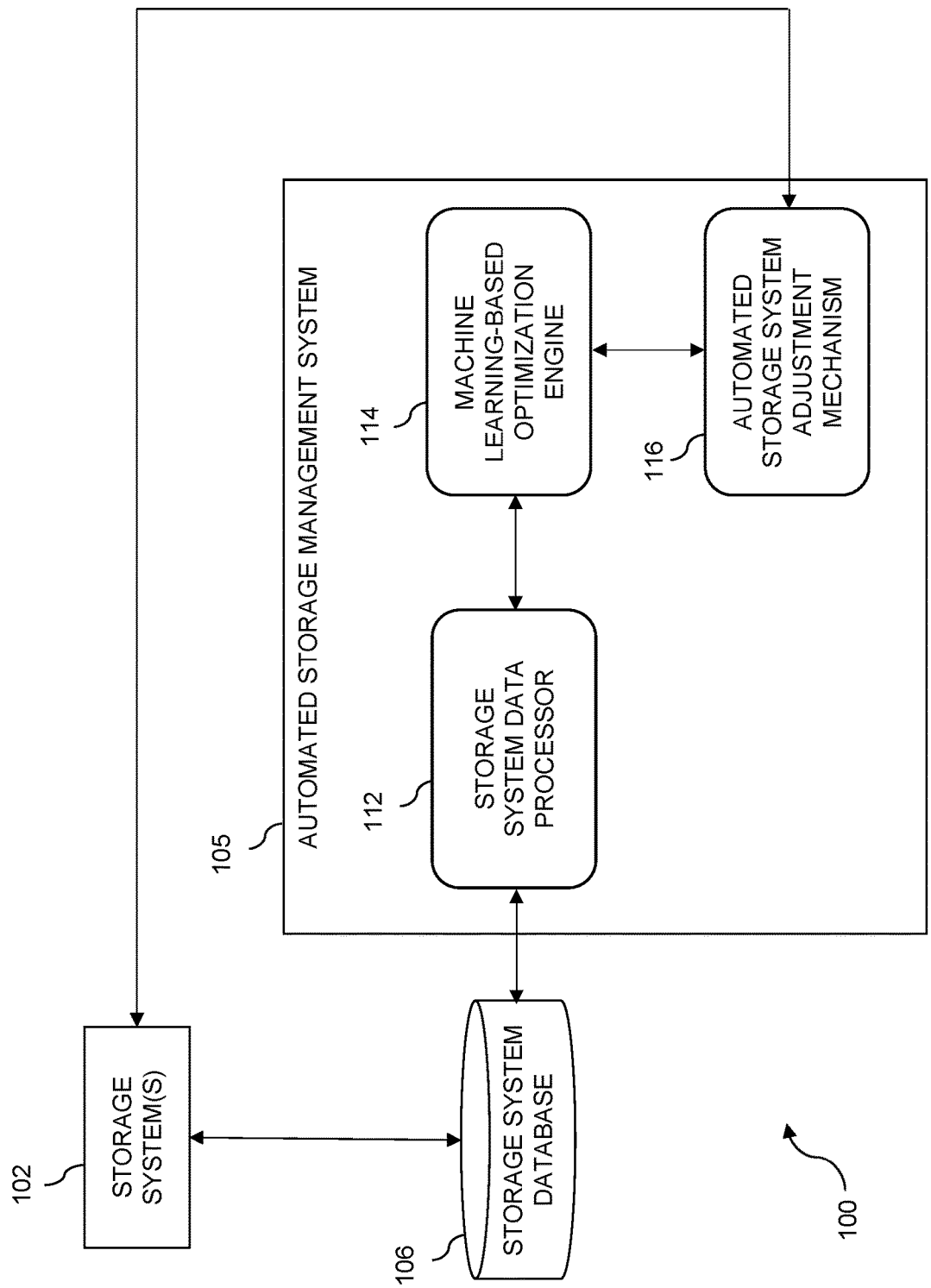
FIG. 1 shows an information processing system configured for automatically adjusting storage system configurations in a STaaS environment using machine learning techniques in an illustrative embodiment.

FIG. 1 shows an information processing system 100 configured in accordance with an illustrative embodiment. The information processing system 100 comprises one or more storage systems 102. The storage system(s) 102 are coupled to a network, where the network in such an embodiment is assumed to represent a sub-network or other related portion of the larger information processing system 100. Also coupled to the network is automated storage management system 105.

The storage system(s) 102 may comprise, for example, storage objects such as pools, file systems, logical storage volumes (e.g., logical units or LUNs), etc. The storage system(s) 102 in some embodiments may comprise respective storage systems associated with a particular company, organization or other enterprise.

In addition, at least portions of the information processing system 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The above-noted network is assumed to comprise a portion of a global computer network such as the Internet, although other types of networks can be part of the information processing system 100, including a wide area network (WAN), a local area network (LAN), a satellite network, a telephone or cable network, a cellular network, a wireless network such as a Wi-Fi or WiMAX network, or various portions or combinations of these and other types of networks. The information processing system 100 in some embodiments therefore comprises combinations of multiple different types of networks, each comprising processing devices configured to communicate using internet protocol (IP) or other related communication protocols.

Additionally, automated storage management system 105 can have an associated storage system database 106 configured to store data pertaining to performance and/or configuration parameters of the corresponding storage system(s) 102.

The storage system database 106 in the present embodiment is implemented using one or more storage systems associated with automated storage management system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated storage management system 105 can be one or more input-output devices, which illustratively comprise keyboards, displays or other types of input-output devices in any combination. Such input-output devices can be used, for example, to support one or more user interfaces to automated storage management system 105, as well as to support communication between automated storage management system 105 and other related systems and devices not explicitly shown.

Additionally, automated storage management system 105 in the FIG. 1 embodiment is assumed to be implemented using at least one processing device. Each such processing device generally comprises at least one processor and an associated memory, and implements one or more functional modules for controlling certain features of automated storage management system 105.

More particularly, automated storage management system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated storage management system 105 to communicate over a network with the storage system(s) 102, and illustratively comprises one or more conventional transceivers.

The automated storage management system 105 further comprises storage system data processor 112, machine learning-based optimization engine 114, and automated storage system adjustment mechanism 116.

It is to be appreciated that this particular arrangement of elements 112, 114 and 116 illustrated in the automated storage management system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automatically adjusting storage system configurations in a STaaS environment using machine learning techniques is presented by way of illustrative example only, and in other embodiments additional or alternative elements may be used. Thus, another embodiment includes additional or alternative systems, devices and other network entities, as well as different arrangements of modules and other components. For example, in at least one embodiment, automated storage management system 105 and storage system database 106 can be implemented in at least one of the storage systems storage system(s) 102 and/or in an associated management server or set of servers.

An exemplary process utilizing elements 112, 114 and 116 of an example automated storage management system 105 in information processing system 100 will be described in more detail with reference to the flow diagram of FIG. 6.

Accordingly, at least one embodiment includes cost-based array optimization techniques in a STaaS environment. Such an embodiment includes monitoring the array, and using a machine learning-based optimization engine to make adjustments to activity-related performance of the array, ensuring that the activity does not interfere with the user's workload, while consuming leftover resources that the workload is not using. Based on the one or more particular functions (e.g., block return to pool, LUN moves, advanced compression/deduplication optimization, etc.) to be monitored for adjustment, the optimization engine can use, in one or more embodiments, rules-driven and/or machine learning algorithm-driven optimizations. Using a plugin implementation as detailed herein, at least one embodiment can include flexibly using any desired and/or preferred logic for optimization. By way merely of example, machine learning algorithms such as anomaly detection techniques can be implemented in connection with functions such as block return to pool and LUN moves.

Additionally or alternatively, one or more embodiments include providing continuous monitoring and optimization of storage system assets, based at least in part on one or more cost metrics, to maintain consistent performance of at least one primary workload and enabling flexible asset management and/or maintenance without requiring a scheduled maintenance window.

At least one embodiment includes managing one or more storage arrays in a STaaS environment by accelerating and/or decelerating various array functions, ensuring that user production workloads are not significantly affected. Such an embodiment includes expanding the window to carry out management functions to whenever the STaaS array managers want, without having to wait for low-utilization periods or scheduled downtimes. Accordingly, in such an embodiment, when a storage feature is recognized as executing, the feature can be modified and/or updated by adjusting one or more parameters of the corresponding storage system while ensuring that appropriate resources on the storage system are available for executing the users' primary workload(s) efficiently.

As further detailed herein, one or more embodiments include leveraging real-time storage array data and/or data processed by and stored in one or more storage system-related databases. Such an embodiment includes generating and/or implementing a machine learning-based optimization engine in conjunction with such a database. The optimization engine, as described herein, can implement one or more rules for tuning at least a portion of the arrays within a storage system based at least in part on array usage and the functions that are executing on the storage system. Adding rules to the engine and/or otherwise modifying rules within the engine can be carried out on a continuous basis without requiring code upgrades on the arrays. Also, in one or more embodiments, the optimization engine is implemented as a plugin, which facilitates building autonomous storage systems and automated active storage management.

When optimizing arrays in a STaaS environment, the cost of the service can be considered in relation to the return of the service, adjusting the service to ensure that the service is providing a sufficiently high return. As further detailed herein, on a given storage array there are costs for services, such as, for example the relocation costs, the cost to read source and write destinations for LUN moves, the central processing unit (CPU) cycles to return a block to a file system, the CPU cycles to compress a block of data, and the CPU cycles to deduplicate a block of data.

Figure 2:
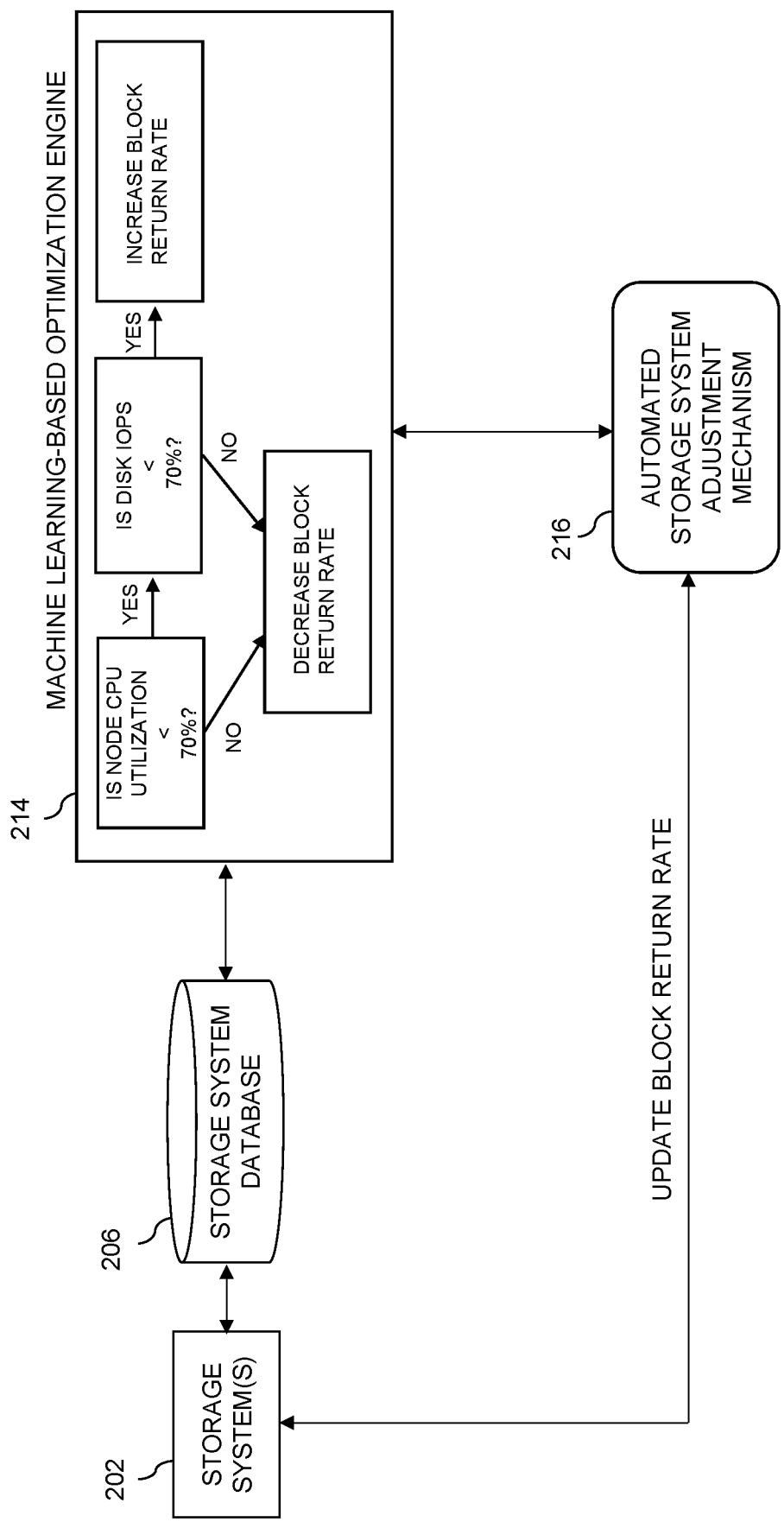
FIG. 2 shows an example implementation of returning blocks to a pool in an illustrative embodiment.

FIG. 2 shows an example implementation of returning blocks to a pool in an illustrative embodiment. By way of illustration, FIG. 2 depicts an example embodiment wherein given data such as CPU utilization, the rate of growth of a storage object's data, etc., the rate of return of evacuation and/or debt throttle (e.g., returning blocks to at least one pool) can be adjusted in conjunction with prioritizing a user's workload (on the corresponding storage system). As used herein, evacuation and/or debt throttle refers to blocks that are free to be returned to a pool. The process of returning the blocks to the pool can be CPU-intensive in that metadata need to be updated, blocks need to be zeroed, etc. If there is a large number of blocks to be returned to the pool, such processes can take over the array as parallelization is in play. A debt throttle can be implemented in order to keep the act of returning the blocks to the pool from affecting a production workload.

As detailed herein, a machine learning-based optimization engine (e.g., engine 214 in FIG. 2) can incorporate one or more rules. An example of implementation of such a rule is in connection with speed control of evacuation and/or debt return to a pool. In a STaaS environment, for example, such an example implementation can be relevant when snaps are deleted and/or when a large amount of user data is deleted. In such an instance, the blocks that had been in use are to be returned to the pool for later use.

Referring again to FIG. 2, data from storage system(s) 202 are obtained and/or captured by storage system database 206, and at least a portion of such data is provided to machine learning-based optimization engine 214. In the embodiment detailed in connection with FIG. 2, such input data provided to machine learning-based optimization engine 214 can include, for example, data pertaining to the rate of blocks returned to a pool per second, the number of new blocks being consumed by a user's workload per second, node CPU utilization, and disk input-output operations per second (IOPS).

The machine learning-based optimization engine 214 processes the provided input data in connection with a set of rules related to block return rate. Specifically, machine learning-based optimization engine 214 determines if node CPU utilization is less than 70% (of a maximum value). If no, then an instruction to decrease block return rate is generated and/or designated. If yes, then machine learning-based optimization engine 214 proceeds to determine if disk IOPS is less than 70%. If no (that is, disk IOPS is greater than 70%), then an instruction to decrease block return rate is generated and/or designated. If yes (that is, disk IOPS is less than 70%), then an instruction to increase block return rate is generated and/or designated. The one or more instructions generated and/or designated by machine learning-based optimization engine 214 are provided to and/or processed by automated storage system adjustment mechanism 216, which automatically updates the block return rate of the storage system(s) 202.

Accordingly, in such an embodiment, if the user is consuming more new blocks per second than blocks are being returned to the pool per second, the block return rate should be increased, taking into consideration node CPU utilization data and disk IOPS data, such that the user's production workload is not significantly affected by the return of one or more blocks. Additionally or alternatively, if the user's workload is relatively idle, the rate of return of blocks should be increased, taking advantage of the lower CPU utilization and disk IOPS attributed to the user's production workload. Also, in such an embodiment, if the user's workload is taxing the array, both the node CPU utilization and disk IOPS are elevated/high, and the consumption of new blocks by the workload is lower than the number of blocks being returned. In such a scenario, the rate of returning the blocks should be decreased, giving the user's production workload priority over the array maintenance. Further, if the node CPU utilization is at an acceptable level but the disk IOPS is elevated/high due to the user's production workload, and the user's workload is not consuming new blocks quickly, the rate of returning blocks to the pool should be decreased, ensuring that the added disk IOPS from returning blocks to the pool does not create a disk bottleneck adding latency to the user's production workload. Additionally or alternatively, in such an embodiment, if the node CPU utilization is elevated/high, the disk IOPS is at an acceptable level, and the user's workload is not consuming new blocks quickly, the return of blocks to the pool should be decreased, giving priority to the user's production workload.

Figure 3:
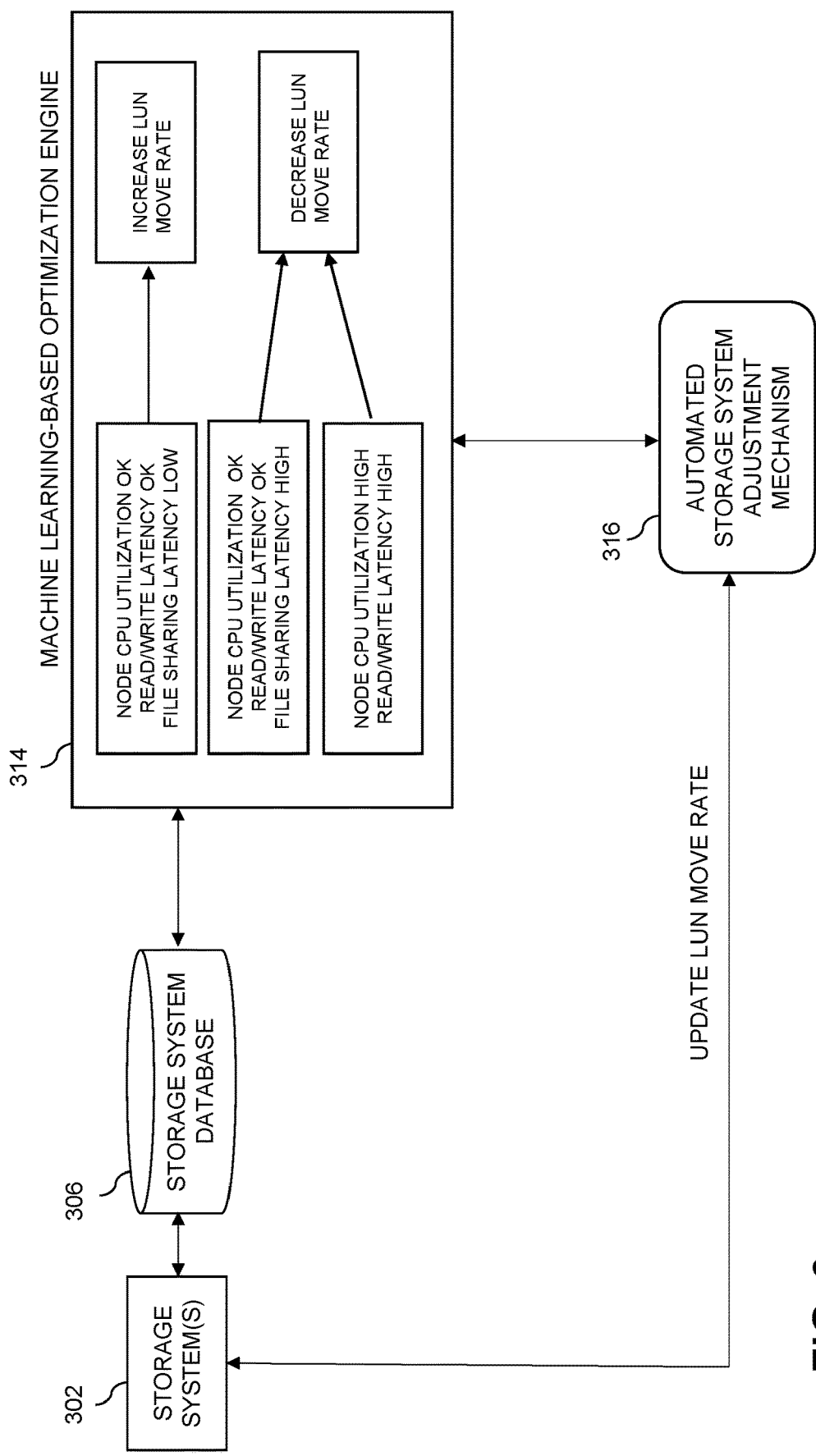
FIG. 3 shows an example implementation of moving LUNs in an illustrative embodiment.

FIG. 3 shows an example implementation of moving LUNs in an illustrative embodiment. By way of illustration, FIG. 3 depicts an example embodiment wherein given data such as start time of LUN moves, blocks moved per second, node utilization, disk IOPS, read/write latency, and/or file sharing latency (e.g., SMB2/NFS operation latency), the speed of moving LUNs can be adjusted (i.e., sped up or slowed down) in conjunction with prioritizing a user's workload (on the corresponding storage system). An example implementation of rules related to speed control of LUN moves, such that the moves do not overly impact user workload performance, is illustrated in FIG. 3. In a STaaS environment, such an implementation can come into play when a pool becomes close to full. In such a scenario, the user will potentially want to move at least one LUN to a new pool. Such a move can involve moving a large amount of data, sometimes during common production hours. In one or more embodiments, the move's effect on the production workload is monitored and the rate of movement decelerated or accelerated depending on the workload on the array. Such a method can allow LUN moves to be initiated at any time and potentially completed sooner than under conventional approach limitations.

Referring again to FIG. 3, data from storage system(s) 302 are obtained and/or captured by storage system database 306, and at least a portion of such data is provided to machine learning-based optimization engine 314. In the example embodiment detailed in connection with FIG. 3, such input data provided to machine learning-based optimization engine 314 can include, for example, data pertaining to the start of LUN moves, the end of LUN moves, the number of blocks moved per second, node CPU utilization, disk IOPS, read and write latency, and (if applicable) file sharing latency.

The machine learning-based optimization engine 314 processes the provided input data in connection with a set of rules related to LUN move rate. Specifically, machine learning-based optimization engine 314 determines if node CPU utilization is satisfactory (also referred to in FIG. 3 as "OK"), if read and write latency is satisfactory, and if file sharing latency is low (relative to a predetermined level), and if so, then an instruction to increase LUN move rate is generated and/or designated. If, however, node CPU utilization is determined to be satisfactory, read and write latency is determined to be satisfactory, but file sharing latency is determined to be high (relative to the predetermined level), then an instruction to decrease LUN move rate is generated and/or designated. Similarly, if node CPU utilization is determined to be high (relative to a predetermined level) and read and write latency is determined to be high (relative to a predetermined level), then an instruction to decrease LUN move rate is generated and/or designated. The one or more instructions generated and/or designated by machine learning-based optimization engine 314 are provided to and/or processed by automated storage system adjustment mechanism 316, which automatically updates the LUN move rate of the storage system(s) 302.

Accordingly, in such an embodiment, machine learning-based optimization engine 314 can recognize, in connection with processing data from storage system(s) 302, the start of one or more LUN moves and the source(s) and destination(s) of the move(s). As such, and as depicted in FIG. 3, if the node utilization is high, and read and write latency is high, on either the source or destination pool, then the LUN move rate is to be decelerated. If the node utilization is high, the read and write latency is OK, and file sharing latency is high (if applicable, non-read/write operation latency), then the LUN move rate is to be decelerated as well. However, if the node utilization is OK, the read and write latency is OK, and the file sharing latency is OK (if applicable), then the LUN move rate is to be accelerated.

Figure 4:
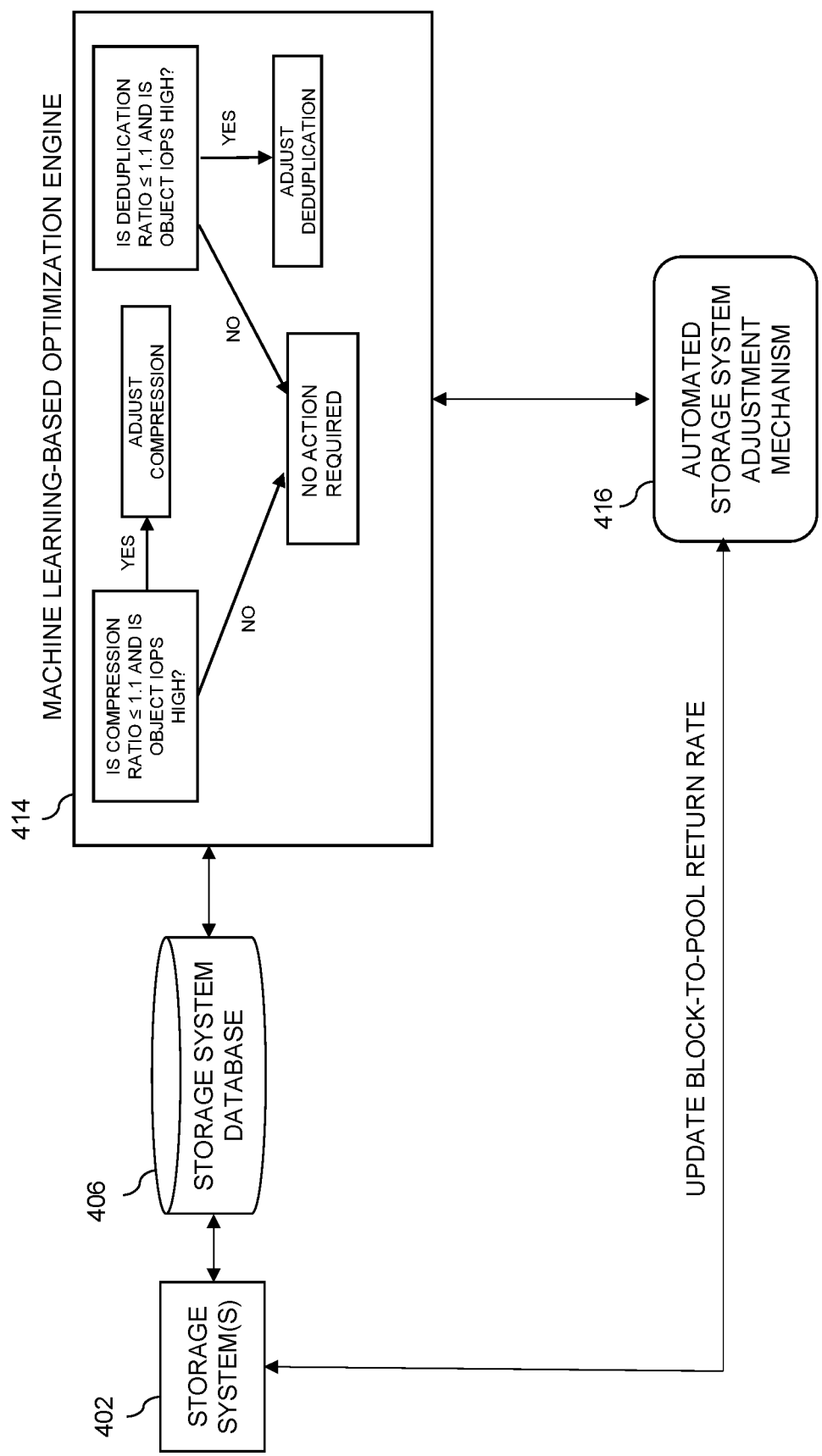
FIG. 4 shows an example implementation of compression and deduplication optimization in an illustrative embodiment.

FIG. 4 shows an example implementation of compression and deduplication optimization in an illustrative embodiment. By way of illustration, FIG. 4 depicts an example embodiment wherein compression and deduplication settings for a given storage system can be automatically adjusted. For example, given a compression ratio and object IOPS, such an embodiment can include determining one or more adjustments to the compression setting. Similarly, given a deduplication ratio and object IOPS, such an embodiment can include determining one or more adjustments to the deduplication setting. In the STaaS environment, for example, compression and deduplication settings can be enabled on all LUNs and file systems.

Referring again to FIG. 4, data from storage system(s) 402 are obtained and/or captured by storage system database 406, and at least a portion of such data is provided to machine learning-based optimization engine 414. In the example embodiment detailed in connection with FIG. 4, such input data provided to machine learning-based optimization engine 414 can include, for example, data pertaining to LUN/file system IOPS, LUN/file system compression ratio information, and LUN/file system deduplication ratio information.

The machine learning-based optimization engine 414 processes the provided input data in connection with a set of rules related to block-to-pool return rate. Specifically, in the example embodiment depicted in FIG. 4, machine learning-based optimization engine 414 determines if the compression ratio is less than or equal to 1.1, and if storage object IOPS is high (relative to a predetermined level). As used herein in connection with the FIG. 4 embodiment, the value of 1.1 is merely used as an illustrative example, and it is to be appreciated that other threshold values can be selected and/or utilized. In this example embodiment, 1.1 refers to 10% data reduction, and if the data reduction value is less than 10%, the CPU cost is higher than the return for the work.

Referring again to FIG. 4, if the compression ratio is not less than or equal to 1.1, and/or the storage object IOPS is not high, then no action is required. If the compression ratio is less than or equal to 1.1, and/or the storage object IOPS is high, then an instruction to adjust the compression setting is generated and/or designated.

As also illustrated in FIG. 4, machine learning-based optimization engine 414 determines if the deduplication ratio is less than or equal to 1.1, and if storage object IOPS is high (relative to the predetermined level). If no, then no action is required. If yes, then an instruction to adjust the deduplication setting is generated and/or designated. The one or more instructions generated and/or designated by machine learning-based optimization engine 414 are provided to and/or processed by automated storage system adjustment mechanism 416, which automatically updates the block-to-pool return rate of the storage system(s) 402. As used herein, block-to-pool return rate and compression deduplication settings are orthogonal to each other, and are simply two example functions of many functions that can be monitored for adjustment and/or optimized using one or more embodiments.

Accordingly, in such an example embodiment, if the compression ratio is below a specified percentage, and the IOPS for the LUN/file system is at least a specified percentage of the total IOPS for the system, then feedback is generated and/or the array's compression and/or deduplication setting can be automatically tuned/adjusted. Additionally, if a LUN/file system has a compression ratio of less than or equal to 1.1, and the storage object is executing, e.g., 10% of the total IOPS, then the compression setting on the LUN/File system is automatically adjusted because the user is doing non-trivial work on the storage object but it is not worth spending the CPU cycles to carry out the compression. Also, in the example embodiment of FIG. 4, if a LUN/file system has a compression ratio of less than or equal to 1.1 and the storage object is executing, e.g., 0.1% of the total IOPS, then no action is required. In such a scenario, while the compression ratio is suboptimal, the cost of compressing the blocks is low because a small portion of the user's workload is running on the storage object, and the return of CPU cycles would be negligible. Further, if a LUN/file system has a compression ratio of greater than 1.1 and the storage object is executing, e.g., 10% of the total IOPS, then no action is required, as the compression ratio is acceptable and compression should be enabled accordingly.

Figure 5:
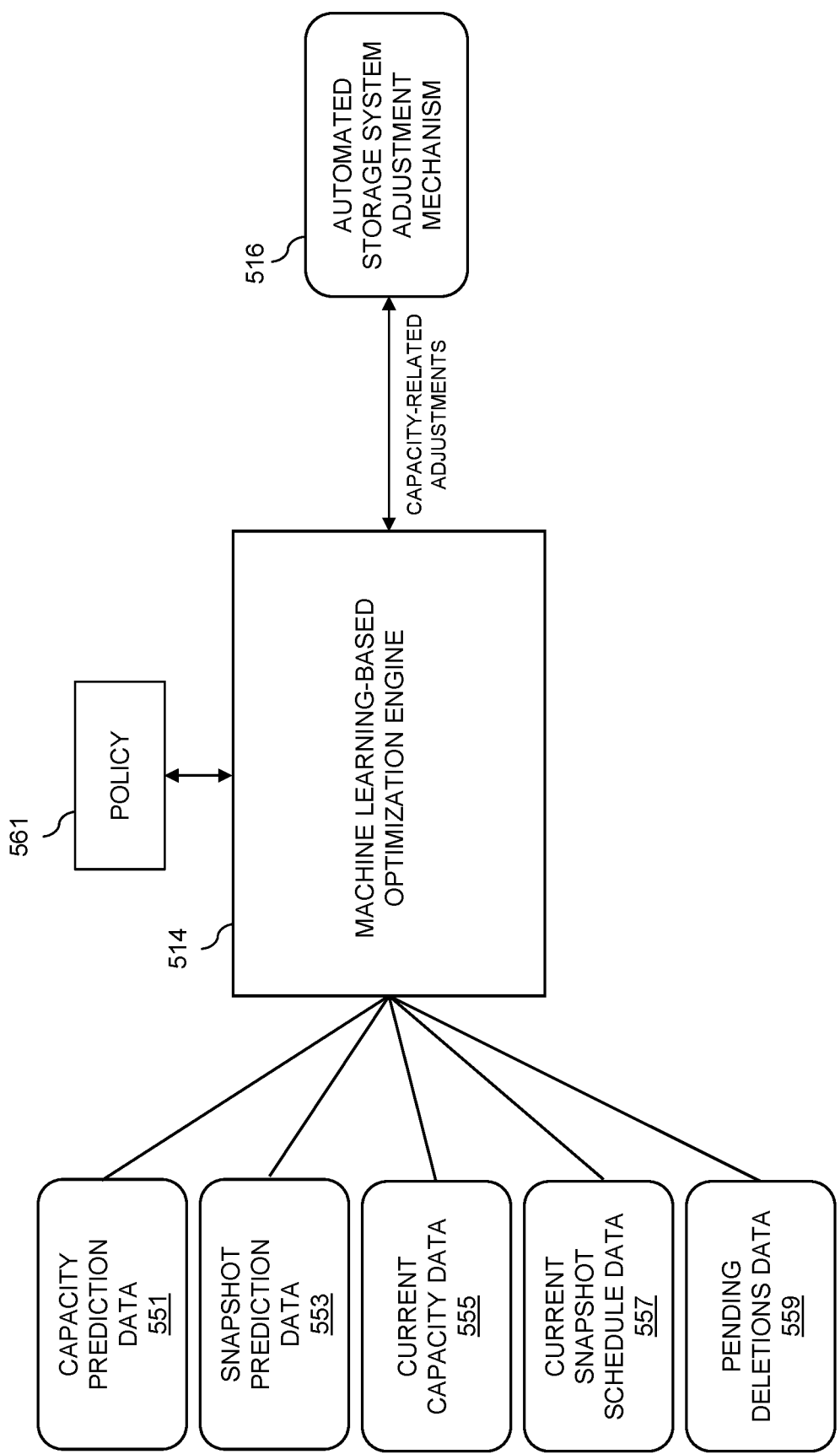
FIG. 5 shows an example machine learning-based optimization engine in an illustrative embodiment.

FIG. 5 shows an example machine learning-based optimization engine in an illustrative embodiment. By way of illustration, FIG. 5 depicts various forms and/or types of data being obtained and processed by machine learning-based optimization engine 514. Such data, as illustrated in FIG. 5, can include capacity prediction data 551, snapshot prediction data 553, current capacity data 555, current snapshot schedule data 557, and pending deletions data 559. In addition to processing and/or evaluating such input data, machine learning-based optimization engine 514 considers and/or processes user policy information 561. Based on cost information determined by machine learning-based optimization engine 514 in connection with the processing of the user policy 561 and at least a portion of the above-noted input data, machine learning-based optimization engine 514 identifies which parameter(s) should be adjusted, and determines the appropriate corresponding amount and/or level of adjustment.

In one or more embodiments, cost information can be determined using one or more factors. By way merely of example, if the data reduction ratio is 1.0, which means that no data reduction is occurring on the LUN/object, but there is no I/O being done on the LUN/object, then the cost of data reduction of the LUN/object is 0.

Additionally, with respect to adjustments, in one or more embodiments, the optimization engine utilizes and/or is provided ranges for each parameter to be adjusted. As adjustment of a given parameter occurs, the optimization engine will update its knowledge of the effect and/or impact of the adjustment, if any, and will re-adjust (the amount of adjustment) if necessary. An example of a high cost of data reduction might include a scenario wherein a LUN/object is being significantly affected with IOPS, but the data reduction ratio is 1.0. In such a scenario, data reduction should not be implemented, because the data reduction is being executed for every request, with no return for the work. The algorithm, in such a scenario, is simply consuming CPU cycles. This would represent an exemplary candidate for adjustment, with a good return on the adjustment. It is to be noted that this is merely one example scenario using data reduction, and that other example scenarios can be acted upon by one or more embodiments with respect to different costs associated with other adjustments that can be carried out for one or more monitored functions.

Referring again to FIG. 5, determinations made by the machine learning-based optimization engine 514 (e.g., as related to capacity in the FIG. 5 example embodiment) are provided to automated storage system adjustment mechanism 516, which uses the information to carry out one or more related automated actions in connection with the storage system(s) in question. Additionally, at least one embodiment can include subsequently monitoring and/or determining whether the automated actions produced the desired result(s), and if not, reiterating the above-detailed adjustment steps.

In connection with an example embodiment such as depicted in FIG. 5, an example user policy pertaining, for instance, to automatic deletion operations might include the following:
Generate Alert; Automatically Delete:
Pool consumption:
When pool reaches N1% full within M1 days;
Continue deleting until pool capacity reaches N2% full within M2 days.
Snapshot consumption:
When snapshot consumption reaches N3% full within M3 days;
Continue deleting until pool capacity reaches N4% full within M4 days.

Additionally, in such an example scenario, a machine learning-based optimization engine (such as detailed herein in connection with various embodiments) can perform the following calculation: Snapshot Deletion Rate=$w\_1$*(capacity prediction)+$w\_2$*(snapshot prediction)+$w\_3$*(current capacity)+$w\_4$*(current snapshot schedule)+$w\_5$*(snapshot pending deletion).

Accordingly, as detailed herein, one or more embodiments include implementing autonomous array management in a STaaS environment based at least in part on real-time, continuous analysis of different aspects/features of at least one given storage system (e.g., relocation, evacuations, data reduction, LUN move rate, etc.). Such an embodiment can be implemented, for example, as a plugin to one or more storage systems and/or components thereof. Additionally, at least one embodiment includes combining at least one rule-based approach used to capture domain knowledge and at least one machine learning-based approach used to capture a feedback loop. Further, in such an embodiment, an optimization engine can be implemented, which comprises an application that takes different inputs to implement various optimization and/or parameter changing rules to ameliorate peaks and valleys of specific storage system functions to ensure that user production workloads maintain low latency, high IOPS, etc.

Figure 6:
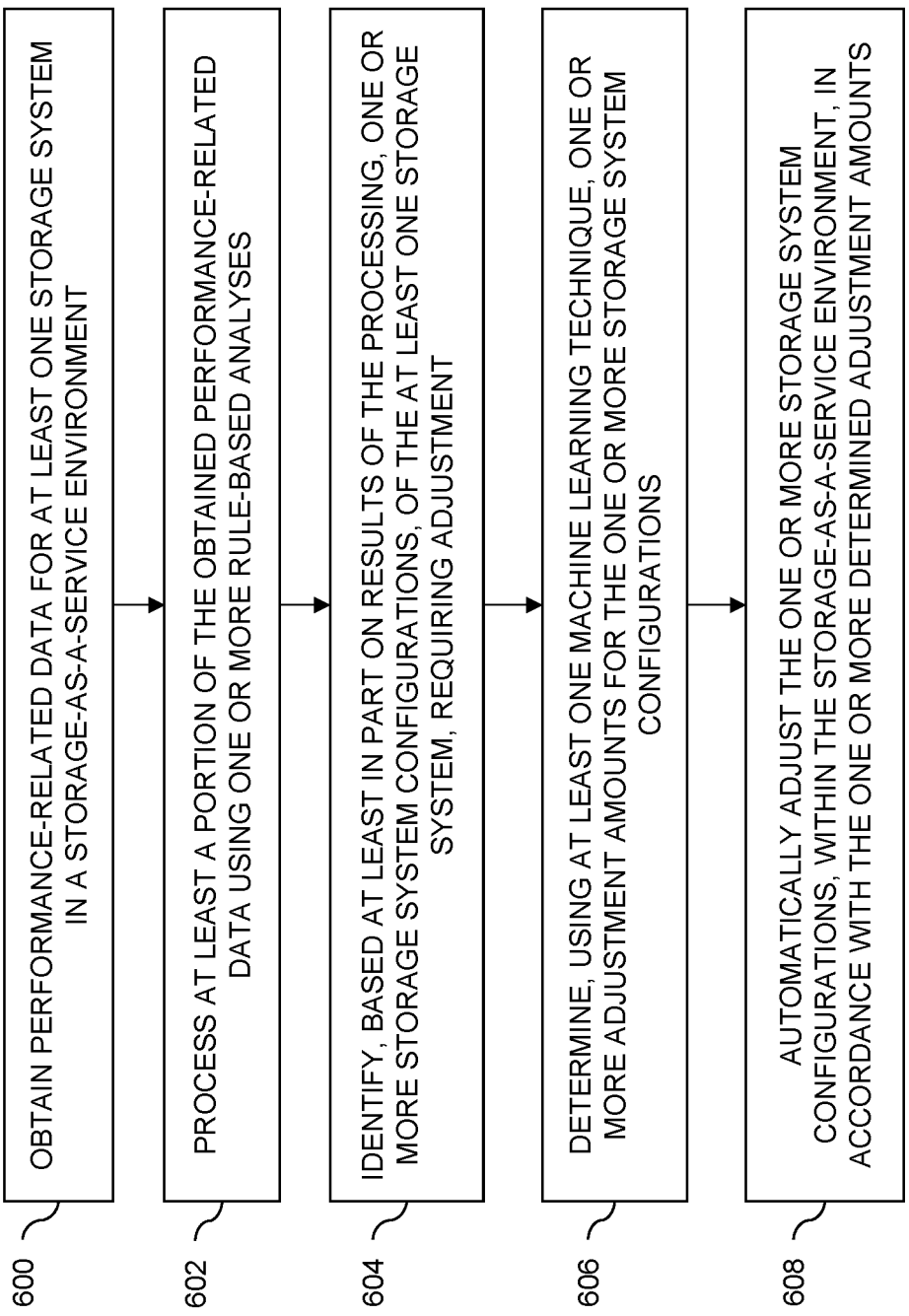
FIG. 6 is a flow diagram of a process for automatically adjusting storage system configurations in a STaaS environment using machine learning techniques in an illustrative embodiment.

FIG. 6 is a flow diagram of a process for automatically adjusting storage system configurations in a STaaS environment using machine learning techniques in an illustrative embodiment. It is to be understood that this particular process is only an example, and additional or alternative processes can be carried out in other embodiments.

In this embodiment, the process includes steps 600 through 608. These steps are assumed to be performed by the automated storage management system 105 utilizing elements 112, 114 and 116.

Step 600 includes obtaining performance-related data for at least one storage system in a STaaS environment. Step 602 includes processing at least a portion of the obtained performance-related data using one or more rule-based analyses. In at least one embodiment, processing the at least a portion of the obtained performance-related data using one or more rule-based analyses includes comparing the at least a portion of the obtained performance-related data against one or more predetermined threshold values for one or more aspects of the performance-related data.

Step 604 includes identifying, based at least in part on results of the processing, one or more storage system configurations, of the at least one storage system, requiring adjustment. In one or more embodiments, identifying the one or more storage system configurations requiring adjustment includes analyzing at least a portion of the results of the processing using one or more cost metrics. In such an embodiment, the one or more cost metrics can include metrics pertaining to one or more of relocation costs, costs to read source and write destinations for LUN moves, CPU cycles to return a block to a file system, CPU cycles to compress a block of data, and CPU cycles to deduplicate a block of data.

Step 606 includes determining, using at least one machine learning technique, one or more adjustment amounts for the one or more storage system configurations. In at least one embodiment, determining one or more adjustment amounts for the one or more storage system configurations includes determining the one or more adjustment amounts based at least in part on ensuring that resources on the at least one storage system remain available for executing at least one user workload. Additionally or alternatively, determining one or more adjustment amounts for the one or more storage system configurations can include determining at least one of accelerating a rate of at least one storage system function by at least one given amount and decelerating a rate of at least one storage system function by at least one given amount. In such an embodiment, the at least one storage system function can include at least one of returning one or more blocks to at least one pool, moving one or more LUNs, data compression, and data deduplication.

Step 608 includes automatically adjusting the one or more storage system configurations, within the STaaS environment, in accordance with the one or more determined adjustment amounts. At least one embodiment also includes monitoring at least a portion of the performance-related data subsequent to the automatic adjusting of the one or more storage system configurations. Such an embodiment additionally includes determining, based at least in part on results of the monitoring and using the at least one machine learning technique, one or more additional adjustment amounts for at least a portion of the one or more storage system configurations, and automatically re-adjusting the at least a portion of the one or more storage system configurations, within the STaaS environment, in accordance with the one or more determined additional adjustment amounts. Further, one or more embodiments can include updating, based at least in part on results of the monitoring, at least a portion of the one or more rule-based analyses using the at least one machine learning technique.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically adjust and/or optimize storage system configurations in a STaaS environment using machine learning techniques. These and other embodiments can effectively overcome problems with the conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of information processing system 100, these platforms may also be used to implement at least portions of other information processing systems in other embodiments.

Figure 7:
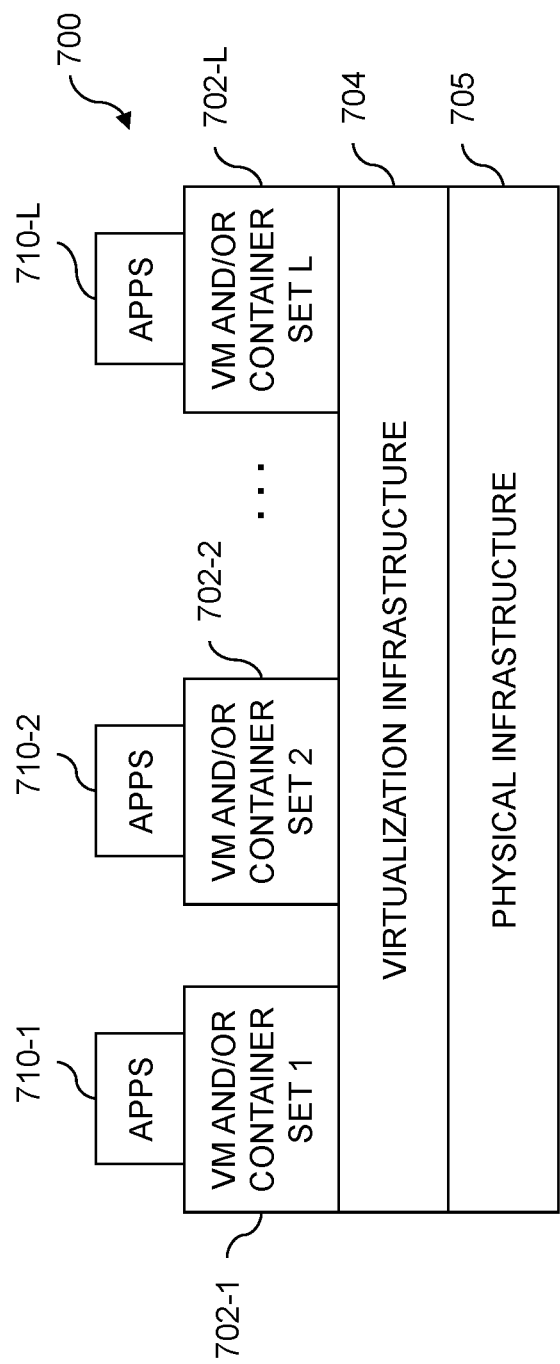
FIGS. 7 and 8 show examples of processing platforms that may be utilized to implement at least a portion of an information processing system in illustrative embodiments.
Figure 8:
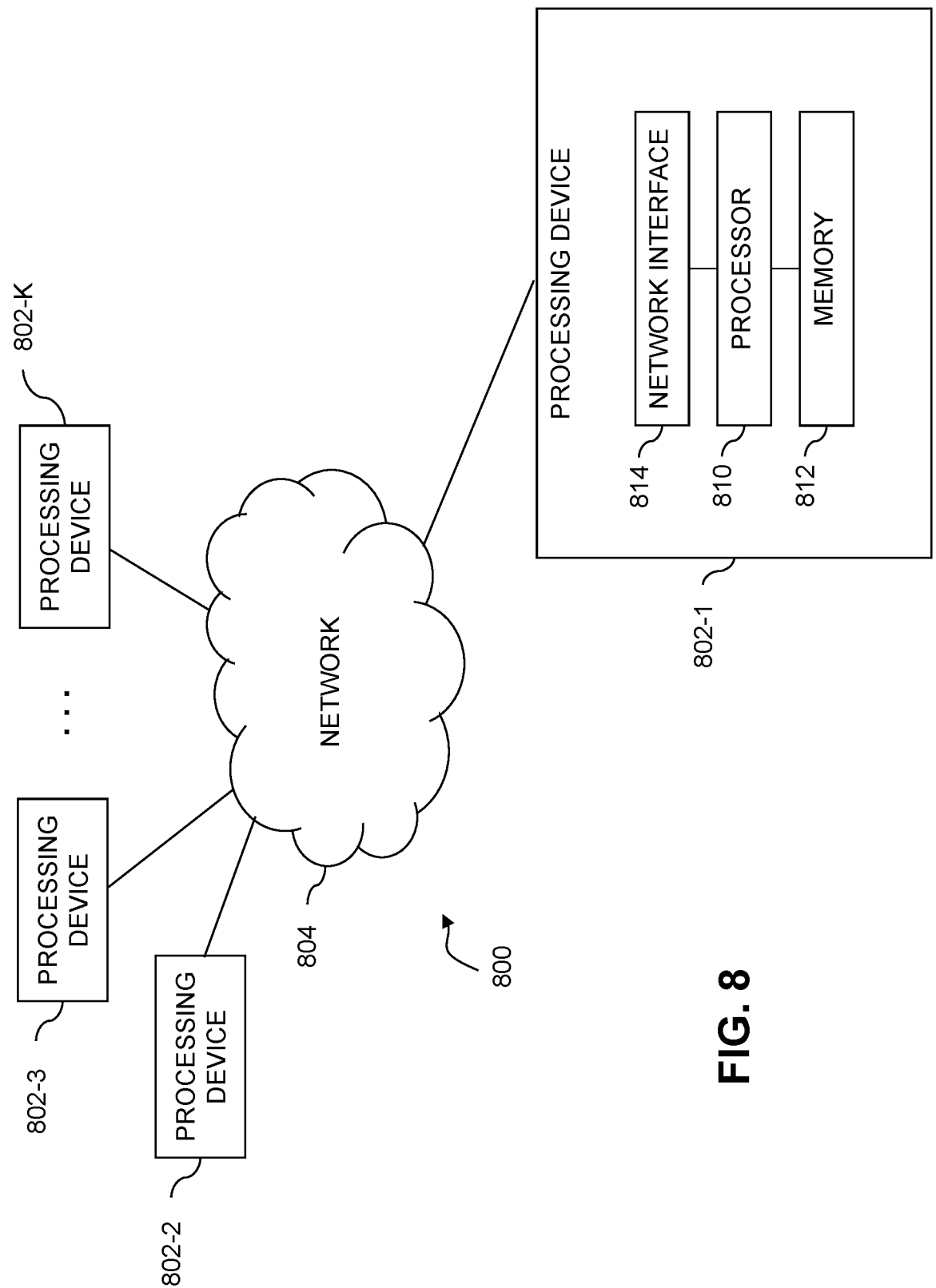

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of information processing system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an application-specific integrated circuit (ASIC), a field-programmable gate array (FPGA) or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining performance-related data for at least one storage system in a storage-as-a-service environment;
processing at least a portion of the obtained performance-related data using one or more rule-based analyses;

identifying, based at least in part on results of the processing, one or more storage system configurations, of the at least one storage system, requiring adjustment;

determining, using at least one machine learning technique, one or more adjustment amounts for the one or more storage system configurations, wherein determining one or more adjustment amounts for the one or more storage system configurations comprises ensuring that a predetermined amount of resources of the at least one storage system remain available, separate from resources required for adjusting the one or more storage system configurations, for executing at least one predetermined user workload on the at least one storage system; and automatically adjusting the one or more storage system configurations, within the storage-as-a-service environment, in accordance with the one or more determined adjustment amounts;

wherein the method is performed by at least one processing device comprising a processor coupled to a memory.

2. The computer-implemented method of claim 1, further comprising:

monitoring at least a portion of the performance-related data subsequent to the automatic adjusting of the one or more storage system configurations.

3. The computer-implemented method of claim 2, further comprising:

determining, based at least in part on results of the monitoring and using the at least one machine learning technique, one or more additional adjustment amounts for at least a portion of the one or more storage system configurations.

4. The computer-implemented method of claim 3, further comprising:

automatically re-adjusting the at least a portion of the one or more storage system configurations, within the storage-as-a-service environment, in accordance with the one or more determined additional adjustment amounts.

5. The computer-implemented method of claim 2, further comprising:

updating, based at least in part on results of the monitoring, at least a portion of the one or more rule-based analyses using the at least one machine learning technique.

6. The computer-implemented method of claim 1, wherein determining one or more adjustment amounts for the one or more storage system configurations comprises determining at least one of accelerating a rate of at least one storage system function by at least one given amount and decelerating a rate of at least one storage system function by at least one given amount.

7. The computer-implemented method of claim 1, wherein identifying the one or more storage system configurations requiring adjustment comprises analyzing at least a portion of the results of the processing using one or more cost metrics.

8. The computer-implemented method of claim 1, wherein processing the at least a portion of the obtained performance-related data using one or more rule-based analyses comprises comparing the at least a portion of the obtained performance-related data against one or more predetermined threshold values for one or more aspects of the performance-related data.

9. A non-transitory processor-readable storage medium having stored therein program code of one or more software programs, wherein the program code when executed by at least one processing device causes the at least one processing device:

to obtain performance-related data for at least one storage system in a storage-as-a-service environment;

to process at least a portion of the obtained performance-related data using one or more rule-based analyses;

to identify, based at least in part on results of the processing, one or more storage system configurations, of the at least one storage system, requiring adjustment;

to determine, using at least one machine learning technique, one or more adjustment amounts for the one or more storage system configurations, wherein determining one or more adjustment amounts for the one or more storage system configurations comprises ensuring that a predetermined amount of resources of the at least one storage system remain available, separate from resources required for adjusting the one or more storage system configurations, for executing at least one predetermined user workload on the at least one storage system; and to automatically adjust the one or more storage system configurations, within the storage-as-a-service environment, in accordance with the one or more determined adjustment amounts.

10. The non-transitory processor-readable storage medium of claim 9, wherein the program code when executed by the at least one processing device further causes the at least one processing device:

to monitor at least a portion of the performance-related data subsequent to the automatic adjusting of the one or more storage system configurations.

11. The non-transitory processor-readable storage medium of claim 10, wherein the program code when executed by the at least one processing device further causes the at least one processing device:

to determine, based at least in part on results of the monitoring and using the at least one machine learning technique, one or more additional adjustment amounts for at least a portion of the one or more storage system configurations.

12. The non-transitory processor-readable storage medium of claim 11, wherein the program code when executed by the at least one processing device further causes the at least one processing device:

to automatically re-adjust the at least a portion of the one or more storage system configurations, within the storage-as-a-service environment, in accordance with the one or more determined additional adjustment amounts.

13. The non-transitory processor-readable storage medium of claim 10, wherein the program code when executed by the at least one processing device further causes the at least one processing device:

to update, based at least in part on results of the monitoring, at least a portion of the one or more rule-based analyses using the at least one machine learning technique.

14. An apparatus comprising:

at least one processing device comprising a processor coupled to a memory;

the at least one processing device being configured:

to obtain performance-related data for at least one storage system in a storage-as-a-service environment;

to process at least a portion of the obtained performance-related data using one or more rule-based analyses;

to identify, based at least in part on results of the processing, one or more storage system configurations, of the at least one storage system, requiring adjustment;

to determine, using at least one machine learning technique, one or more adjustment amounts for the one or more storage system configurations, wherein determining one or more adjustment amounts for the one or more storage system configurations comprises ensuring that a predetermined amount of resources of the at least one storage system remain available, separate from resources required for adjusting the one or more storage system configurations, for executing at least one predetermined user workload on the at least one storage system; and to automatically adjust the one or more storage system configurations, within the storage-as-a-service environment, in accordance with the one or more determined adjustment amounts.

15. The apparatus of claim 14, wherein the at least one processing device is further configured:

to monitor at least a portion of the performance-related data subsequent to the automatic adjusting of the one or more storage system configurations.

16. The apparatus of claim 15, wherein the at least one processing device is further configured:

to determine, based at least in part on results of the monitoring and using the at least one machine learning technique, one or more additional adjustment amounts for at least a portion of the one or more storage system configurations.

17. The apparatus of claim 16, wherein the at least one processing device is further configured:

to automatically re-adjust the at least a portion of the one or more storage system configurations, within the storage-as-a-service environment, in accordance with the one or more determined additional adjustment amounts.

18. The apparatus of claim 15, wherein the at least one processing device is further configured:

to update, based at least in part on results of the monitoring, at least a portion of the one or more rule-based analyses using the at least one machine learning technique.

19. The apparatus of claim 14, wherein determining one or more adjustment amounts for the one or more storage system configurations comprises determining at least one of accelerating a rate of at least one storage system function by at least one given amount and decelerating a rate of at least one storage system function by at least one given amount.

20. The apparatus of claim 14, wherein identifying the one or more storage system configurations requiring adjustment comprises analyzing at least a portion of the results of the processing using one or more cost metrics.

* * * * *